United States Patent
Rothberg et al.

(10) Patent No.: US 6,704,153 B1
(45) Date of Patent: Mar. 9, 2004

(54) METHOD FOR ANALYZING MAGNETIC MEDIA SURFACE IN A DISK DRIVE FOR INDICATIONS OF HEAD IMPACT

(75) Inventors: Michael S. Rothberg, Foothill Ranch, CA (US); Jan F. Rebalski, Foothill Ranch, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 221 days.

(21) Appl. No.: 10/011,164

(22) Filed: Nov. 30, 2001

(51) Int. Cl.[7] .......................... G11B 20/18; G11B 27/36
(52) U.S. Cl. ......................... 360/31; 360/25; 360/53; 360/75; 714/42
(58) Field of Search ........................... 360/31, 25, 53, 360/75; 714/42

(56) References Cited

U.S. PATENT DOCUMENTS

| | | | | |
|---|---|---|---|---|
| 5,212,677 A | * | 5/1993 | Shimote et al. | 369/53.17 |
| 5,935,261 A | * | 8/1999 | Blachek et al. | 714/42 |
| 6,154,858 A | | 11/2000 | Ottesen et al. | |
| 6,204,660 B1 | * | 3/2001 | Lee | 324/212 |

* cited by examiner

*Primary Examiner*—David Hudspeth
*Assistant Examiner*—Natalia Figueroa
(74) *Attorney, Agent, or Firm*—Milad G. Shara, Esq.; Robroy R. Fawcett, Esq.

(57) ABSTRACT

The present invention may be embodied in a method, implemented in a disk drive, for analyzing a magnetic media surface for indications of rough handling or "head slap." In the method, a media surface is scanned to detect errors indicative of media defects. Location information is recorded for each detected error. Defect clusters are identified based on the location information. A confidence factor is generated based on a comparison between the defect clusters and a representation of the physical dimensions of the head. Whether the confidence factor indicates an impact between the head and the media surface is determined.

19 Claims, 6 Drawing Sheets

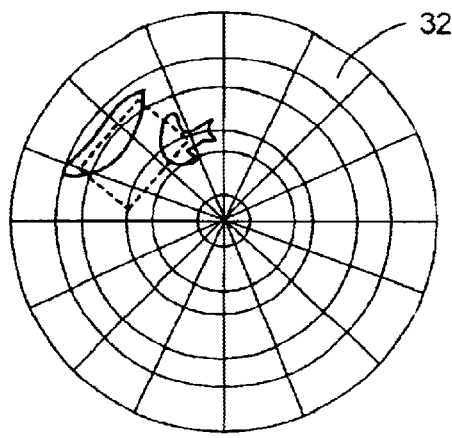
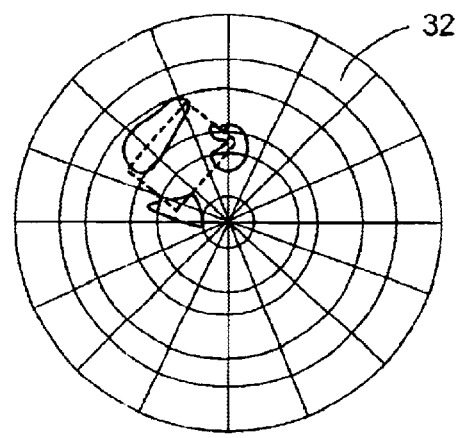
FIG. 9    FIG. 10
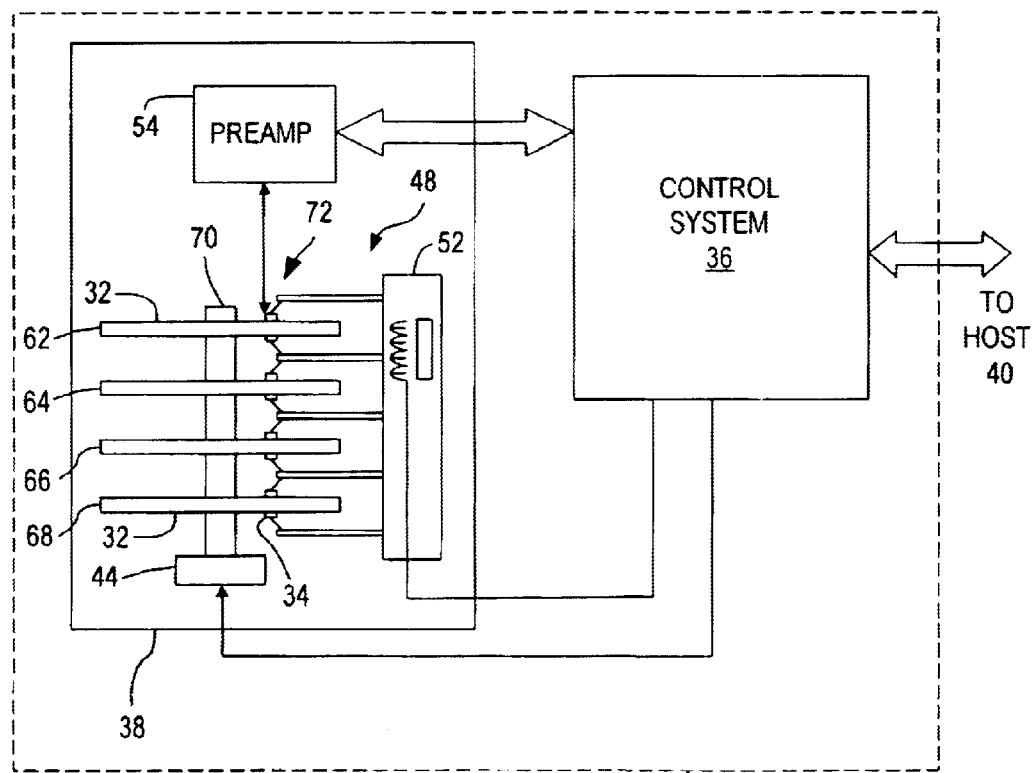
FIG. 11

METHOD FOR ANALYZING MAGNETIC MEDIA SURFACE IN A DISK DRIVE FOR INDICATIONS OF HEAD IMPACT

BACKGROUND OF THE INVENTION

1. Field of the Invention

The present invention relates to disk drive testing, and more particularly, to analyzing a magnetic media surface in a disk drive for damage caused by rough handling.

2. Description of the Prior Art

A damaged disk drive may appear normal for a period of time due to the drive's internal error correction processes. However, once uncorrectable errors begin to appear in data due to media surface damage caused by rough handing, significant irreversible data loss may have already occurred and catastrophic data loss may be imminent. Further, disk drive manufacturers commonly provide warranty coverage that excludes disk drive failure due to rough handling or similar mistreatment. Much of the costs to the manufacturer associated with processing a disk drive exhibiting a failure are incurred by returning the drive back to the manufacturer for testing to determine whether the failure is covered by the warranty.

Accordingly, there exists a need for disk drive analysis techniques for analyzing a magnetic media surface for indications of damage caused by rough handling while the drive is installed in a host computer. The present invention satisfies theses needs.

SUMMARY OF THE INVENTION

The present invention may be embodied in a method, implemented in a disk drive, for analyzing a magnetic media surface for indications of an impact of a read/write head on the surface. In the method, a media surface is scanned to detect errors indicative of media defects. Location information is recorded for each detected error. Defect clusters are identified based on the location information. At least one confidence factor is generated based on a comparison between the defect clusters and a representation of the physical dimensions of the head. Whether the confidence factor(s) indicates an impact between the head and the media surface is determined.

In more detailed features of the invention, data sectors on a portion of the media surface surrounding a suspect location may be mapped into meta-sectors and meta-cylinders that are related to the physical position of the data sectors on the media surface. The location information for each data sector of the surrounding portion of the media surface having a detected error may be recorded by a defect count in a bin associated with the meta-sector and meta-cylinder into which the data sector having the indicative error is mapped. Also, the representation of the physical dimensions of the head may be generated by converting the physical dimensions of the head into meta-physical dimensions related to the mapping of the data sectors into the meta-sectors and meta-cylinders. The meta-sectors may comprise 64 meta-sectors and the meta-cylinders may comprise 32 meta-cylinders. Further, the comparison between the defect clusters and a representation of the physical dimensions of the head may include identifying defect clusters associated with corners of the head. Finally, a bit error threshold for detecting data sectors having errors indicative of media defects may be lower than a bit-error threshold used by the disk drive for placing data sectors on a defect list for preventing data storage in the listed data sectors.

In another embodiment of the invention, the disk drive may include a plurality of media surfaces that are scanned to detect errors indicative of media defects. A confidence factor is generated for each defect cluster. The confidence factors of defect clusters at corresponding positions on the plurality of media surfaces are combined to generate a combined confidence factor. Whether the combined confidence factor indicates impacts between the plurality of heads and the respective media surfaces is determined.

BRIEF DESCRIPTION OF THE DRAWINGS

The accompanying drawings illustrate embodiments of the present invention and, together with the description, serve to explain the principles of the invention.

FIG. 9 is another schematic diagram of two defect groups.

FIG. 10 is another schematic diagram of three defect groups.

FIG. 11 is a block diagram of a disk drive including a head disk assembly having a plurality of disk and magnetic media surfaces.

DETAILED DESCRIPTION

Figure 1:
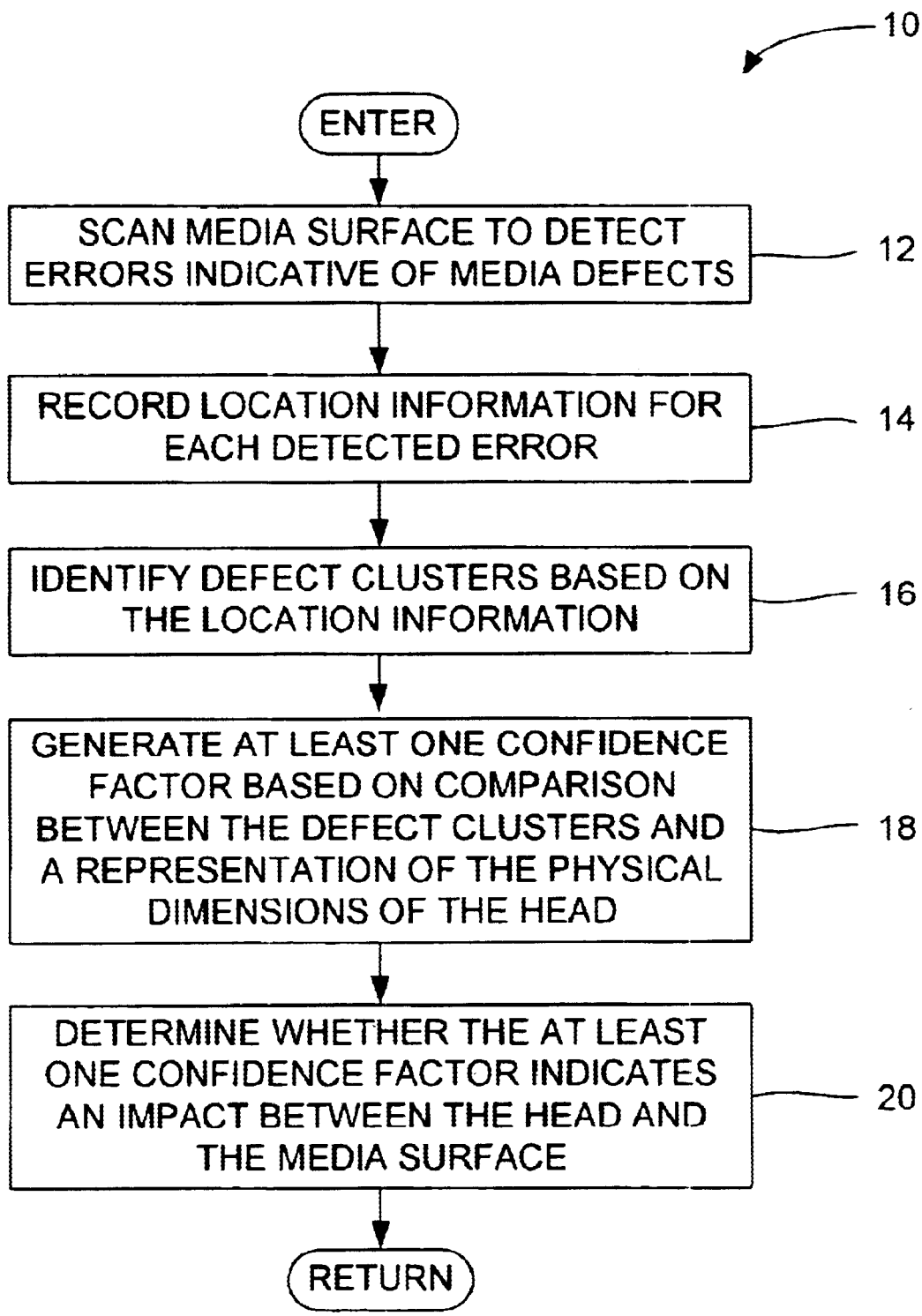
FIG. 1 is a flow chart illustrating an embodiment of a method for analyzing a media surface in a disk drive for indications of a head impact, according to the present invention.
Figure 2:
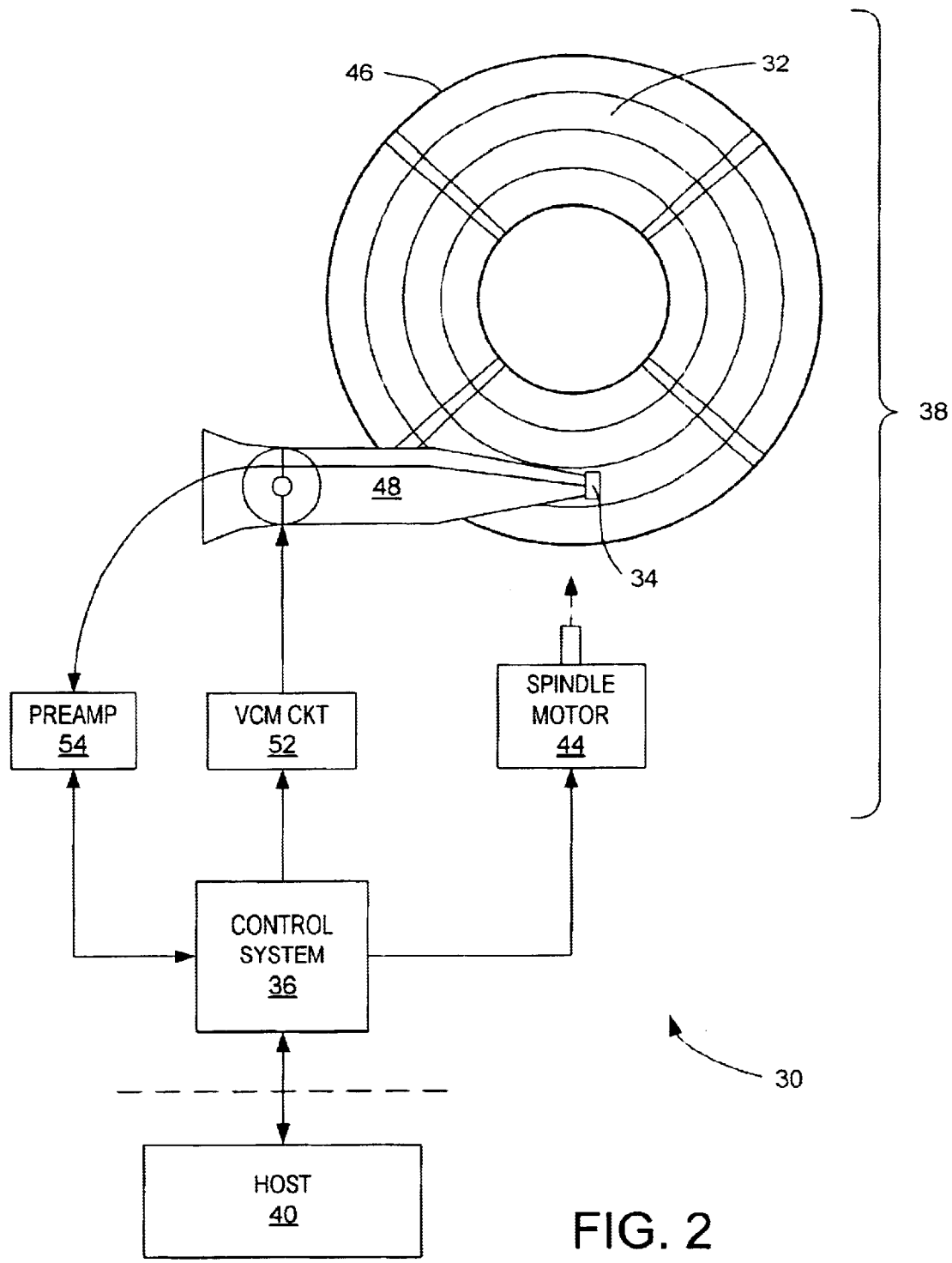
FIG. 2 is a block diagram of a disk drive for implementing the media analysis method of FIG. 1.

With reference to FIGS. 1 and 2, the invention may be embodied in a method 10, implemented in a disk drive 30, for analyzing a magnetic media surface 32 for indications of rough handling. Rough handling of the disk drive may cause a read/write head 34 in the disk drive to impact a media surface and damage the magnetic media layer on the surface. The impact of the head on the media surface is often referred to as "head slap." In the method, a media surface is scanned to detect errors indicative of media defects (block 12). Location information is recorded for each detected error (block 14). Defect clusters are identified based on the location information (block 16). At least one confidence factor is generated based on a comparison between the defect clusters and a representation of the physical dimensions of the head (block 18). Whether the at least one confidence factor indicates an impact between the head and the media surface is determined (block 20).

Figure 3:
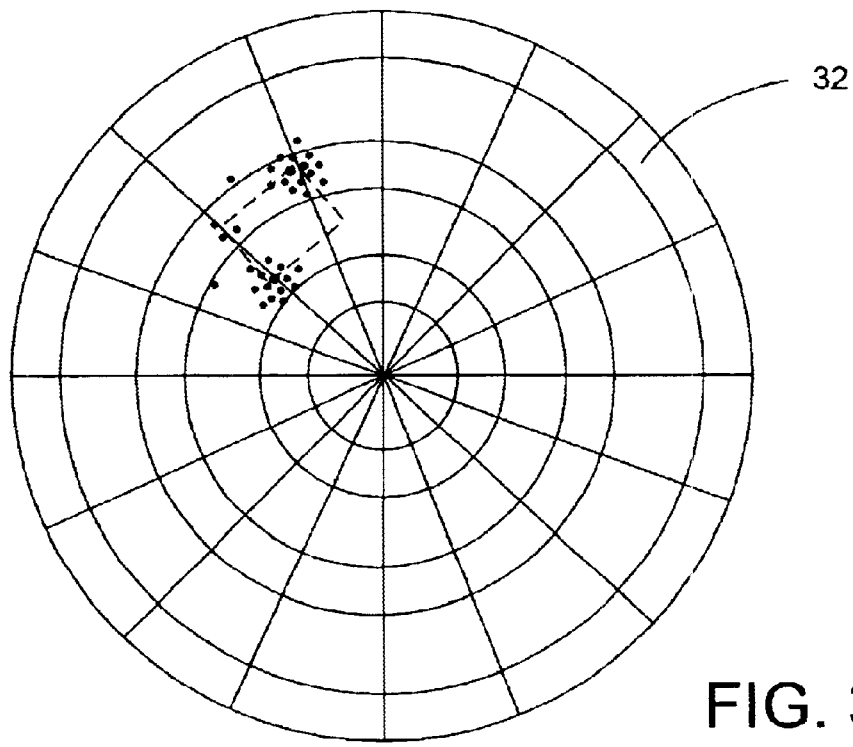
FIG. 3 is a schematic diagram of defects for analyzing a media surface using a first bit-error threshold.

With reference to FIG. 3, the location of each data sector having an error indicative of a media defect is shown as a dot on the media surface 32. The outline of the head 34 is shown by a dotted line. The size of the head has been exaggerated for clarity of illustration. The defect locations are grouped in clusters corresponding to two opposing corners of the head outline providing a level of confidence that an impact of the head caused the defects.

Figure 4:
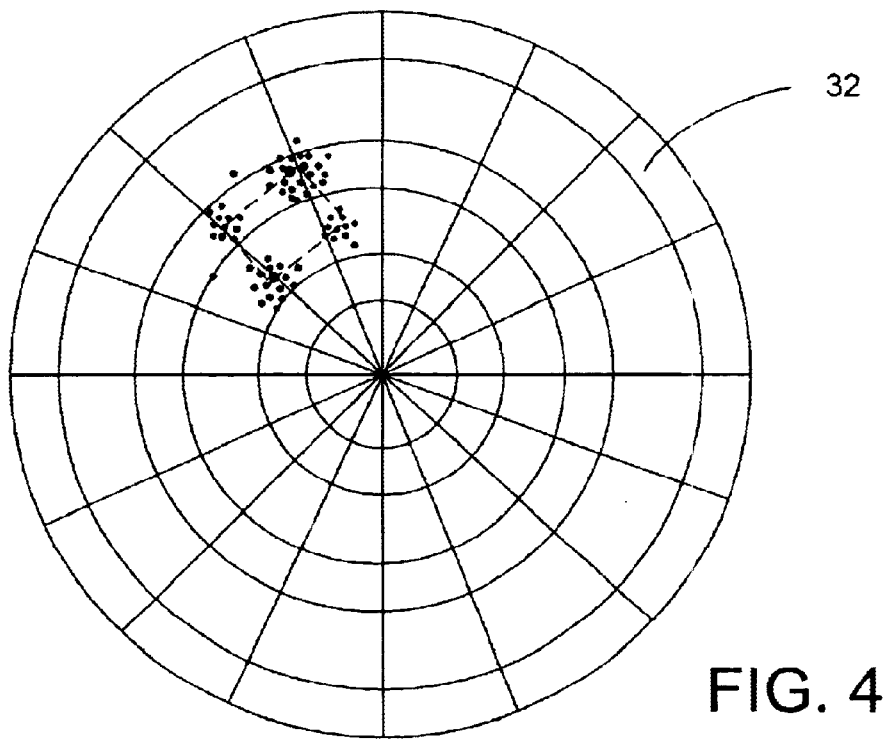
FIG. 4 is a schematic diagram of defects for analyzing a media surface using a second first bit-error threshold.

Typical data sectors store 512 bytes of data accompanied by several bytes (e.g., 9 bytes) of error-correcting code. Accordingly, up to 72 bit errors per data may be corrected. In FIG. 3, a bit-error threshold of 50 bit errors per sector was used for identifying a sector having more bit error than the bit-error threshold and recording the sector as a defect location. The bit-error threshold resulted in 34 data sectors being recorded as defect locations. The bit error threshold may be the same bit-error threshold used by the disk drive 30 for placing data sectors on a defect list for preventing data storage in the listed data sectors. However, a lower bit-error threshold may provide significant advantages in analyzing the media surface 32. In FIG. 4, the bit-error threshold was lowered to 20 bit errors per sector for identifying and recording a sector as a defect location. The lower bit-error threshold resulted in 63 data sectors being recorded as defect locations. More importantly, the defect locations are grouped in clusters corresponding to all four corners of the head outline providing a higher level of confidence that an impact of the head 34 caused the defects.

Figure 5:
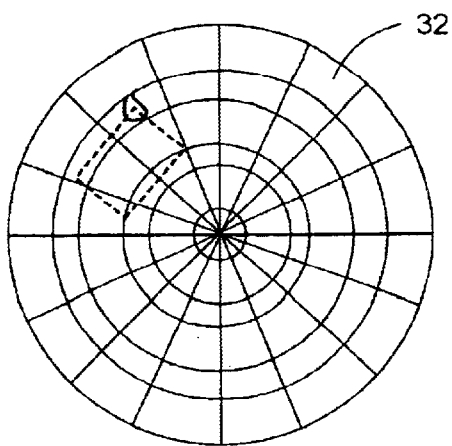
FIG. 5 is a schematic diagram of a defect group and a head outline for use in determining a confidence factor.
Figure 6:
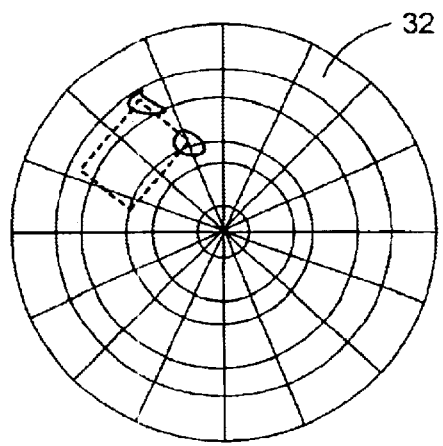
FIG. 6 is a schematic diagram of two defect groups.
Figure 7:
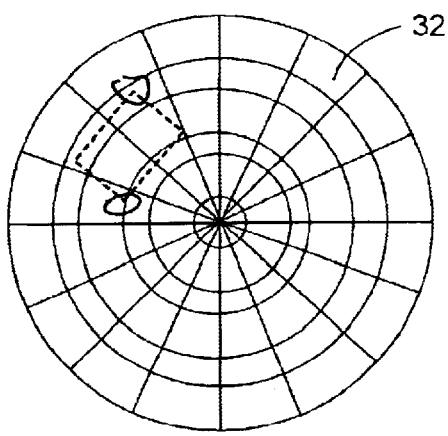
FIG. 7 is another schematic diagram of two defect groups.
Figure 8:
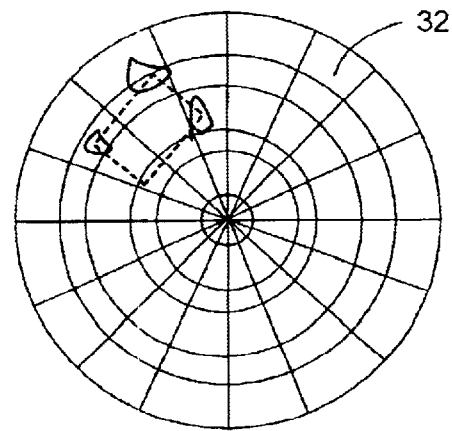
FIG. 8 is a schematic diagram of three defect groups.

With reference to FIGS. 5–10, the defect clusters may form a pattern that corresponds to the physical dimensions of the head 34. A confidence factor may be generated based on a comparison between the defect clusters (location and distance therebetween) and the physical dimensions of the head. In FIG. 5, only one defect cluster has been identified. By itself, the confidence factor associated with one defect cluster does not indicate an impact between the head and the media surface 32. In FIG. 6, two defect clusters have been identified. The two clusters are at locations corresponding to two adjacent corners of the head resulting in a relatively high confidence factor. In FIG. 7, two defect clusters have been identified. The two clusters are at locations corresponding to two opposite corners of the head resulting in a relatively high confidence factor. In FIG. 8, three defect clusters have been identified. The three clusters are at locations corresponding to three corners of the head resulting in a higher confidence factor. In FIG. 9, two defect clusters have been identified. One cluster is at a location corresponding to an edge of the head and the other cluster is at a location corresponding to a corners of the head resulting in a higher confidence factor. FIG. 10, three defect clusters have been identified. One cluster is at a location corresponding to an edge of the head and the other two clusters are at locations corresponding to two remaining corners of the head resulting in a higher confidence factor.

The disk drive 30 (FIG. 2) includes a control system 36 and a head-disk assembly (HDA) 38. The control system includes circuitry and processors that control the HDA and that provide an intelligent interface between a host 40 and the HDA for execution of read and write commands. The control system may have an internal microprocessor and nonvolatile memory for implementing the techniques of the invention. Program code for implementing the techniques of the invention may be stored in the nonvolatile memory and transferred to volatile random access memory (RAM) for execution by the microprocessor. The HDA 38 may include a spindle motor 44, at least one disk 46 (having the magnetic media surface 32), a rotary actuator 48, the head 34, a voice coil motor (VCM) circuit 52, and a preamplifier 54.

Preferably, the media surface analysis method 10 of the invention is implemented by the control system 36 as an internal self-test that may be requested by the host or by the disk drive's internal maintenance system. After the self-test, the control system 36 indicates to the host 40 whether media damage indicative of impact between the head 34 and the media surface 32 has been detected.

During operation, the media surface analysis method 10 uses the limited processing and memory resources of the control system 36. Advantageously, an accelerated scan is performed on the media surface. Data sectors on a portion of the media surface surrounding a suspect location may be mapped in bins representing meta-sectors and meta-cylinders. The meta-sectors and the meta-cylinders are related to the physical position of the data sectors on the media surface. The bins may be configured to occupy 512 bytes of memory and to represent 64 meta-sectors and 32 meta-cylinders. Each byte stores information for 4 discrete bins of two bits. The data sectors surrounding the suspect location may be mapped such that each meta-sector represents the number of physical wedges in a track or physical cylinder divided by 64 (e.g., a disk drive 30 with 128 wedges results in each meta-sector representing 2 physical wedges) and each meta-cylinder represents a slice or donut of 8 physical cylinders. Each bin may record the relative strength of defects in the corresponding region of the media surface. For example, a value of 0 may indicate no defects, a value of 1 may indicate 1 defect, a value of 2 may indicate 2 defects, and a value of 3 may indicate 3 or more defects. The physical dimensions of the head 32 may be converted into "meta-physical" dimensions represented by distances or bin counts between the corners and edges of the head.

The media analysis techniques of the present invention may be preceded by or combined with an accelerated media scan technique that skips tracks to reduce the scan time while maintaining a great deal of certainty that media damage is detected. If media damage is detected, then a full media scan may be performed to determine the scope of the damage. A representative accelerated media scan technique is disclosed in U.S. patent application Ser. No. 09/585,128, filed May 31, 2000, and titled ACCELERATED MEDIA SCAN METHOD FOR DETECTION OF DISK DRIVE HANDLING DAMAGE. The entire disclosure of application Ser. No. 09/585,128 is incorporated herein by reference.

With reference to FIG. 11, the disk drive 30' may include a plurality of disks 62, 64, 66 and 68. The disks are stacked on a spindle assembly 70 that is mechanically coupled to the spindle motor 44 for rotating the disks. Each disk may include up to two magnetic media surfaces 32. The rotary actuator 48 may comprise a head stack assembly 72 for providing a head 34 for each media surface. Often, the outside surface of the first disk 62 and the outside surface of the last disk 52 are the media surfaces where rough handling effects are most pronounced. The media surface analysis technique may be most effective by scanning one or both of these outside surfaces.

The entire head stack assembly 72 is involved in an impact so that damage tends to occur on all of the media surfaces 32 at about the same relative location on each surface. If after scanning one of the surfaces, the confidence factor is not high enough to determine whether media damage has occurred on the surface, e.g., only one defect cluster was located as discussed above with respect to FIG. 5, the media surface analysis technique may be repeated on one or more of the remaining media surfaces. If another media surface has defect clusters at locations corresponding to the locations of the defect clusters on the previous media surface(s), then the confidence factors may be combined. The analysis takes into account head offset and a skew angle resulting from the actuator position. The combined confidence factor may result in a value that indicates an impact between the heads and the respective media surfaces.

Figure 12:
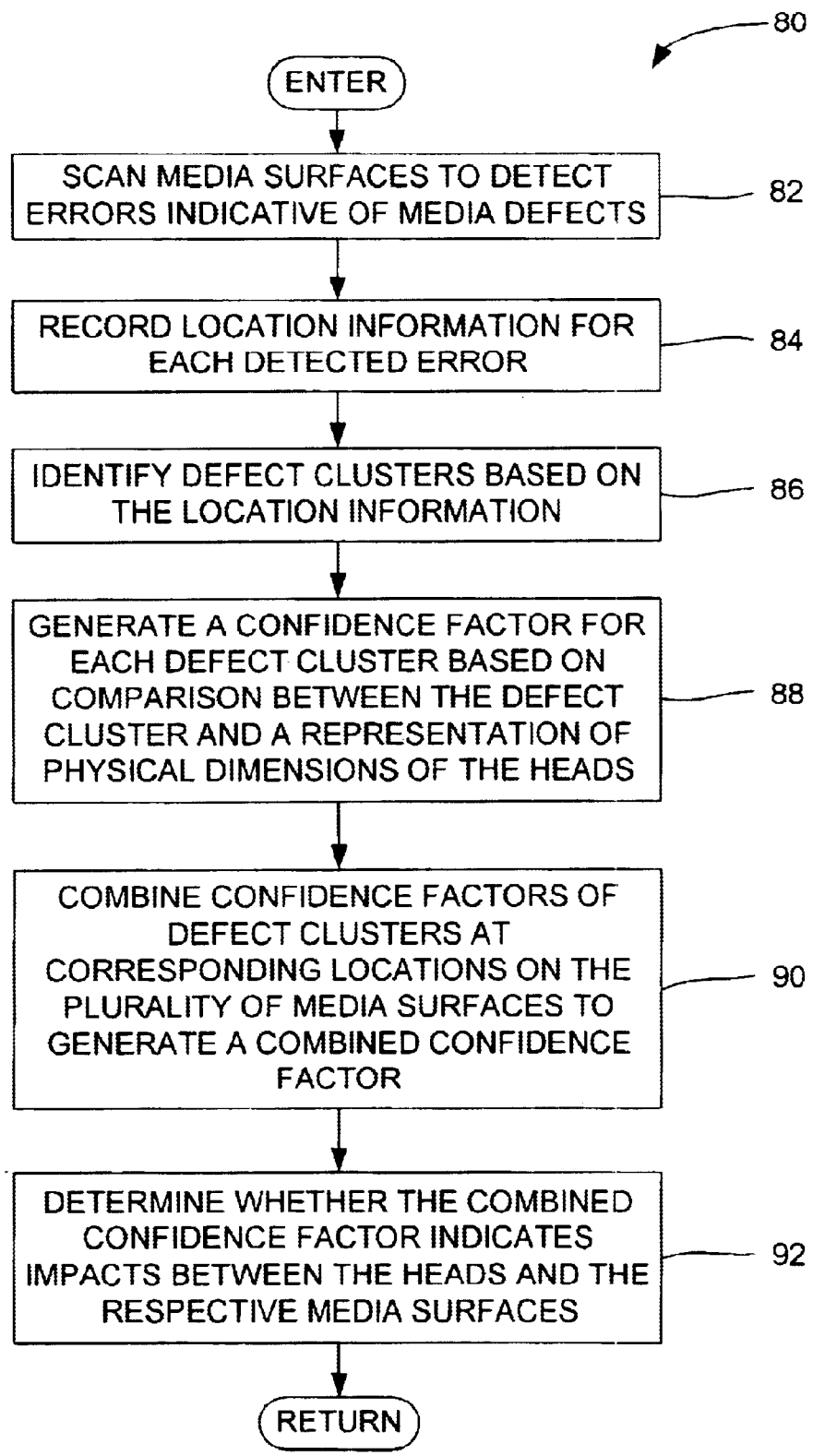
FIG. 12 is a flow chart illustrating a second embodiment of the method for analyzing a plurality of media surfaces in a disk drive for indications of head impacts, according to the present invention.

Another embodiment of the invention, shown in FIG. 12, resides in a method 80 for analyzing a plurality of media surfaces for indications of a head impacts. The plurality of media surfaces is scanned to detect errors indicative of media defects (block 82). Location information is recorded for each detected error (block 84). Defect clusters are identified based on the location information (block 86). A confidence factor is generated for each defect cluster based on a comparison between the defect cluster and a representation of the physical dimensions of the heads (block 88). The confidence factors of defect clusters at corresponding locations on the plurality of media surfaces are combined to generate a combined confidence factor that indicates impacts between the heads and the respective media surfaces (block 90). Whether the combined confidence factor indicates impacts between the plurality of heads and the respective media surfaces is determined (block 92).

We claim:

1. In a disk drive having a rotating disk with a magnetic media surface and having a read/write head, a method for analyzing a media surface for indications of a head impact, comprising the steps of:

scanning a media surface to detect errors indicative of media defects;

recording location information for each detected error;

identifying defect clusters based on the location information;

generating at least one confidence factor based on a comparison between the defect clusters and a representation of the physical dimensions of the head; and determining whether the at least one confidence factor indicates an impact between the head and the media surface.

2. A method for analyzing a media surface as defined in claim 1, wherein:

data sectors on a portion of the media surface surrounding a suspect location are mapped into meta-sectors and meta-cylinders that are related to the physical position of the data sectors on the media surface; and the location information for each data sector of the surrounding portion of the media surface having a detected error is recorded by a defect count in a bin associated with the meta-sector and meta-cylinder into which the data sector having the indicative error is mapped.

3. A method for analyzing a media surface as defined in claim 2, wherein the representation of the physical dimensions of the head is generated by converting the physical dimensions of the head into meta-physical dimensions related to the mapping of the data sectors into the meta-sectors and meta-cylinders.

4. A method for analyzing a media surface as defined in claim 2, wherein the meta-sectors comprise 64 meta-sectors and the meta-cylinders comprise 32 meta-cylinders.

5. A method for analyzing a media surface as defined in claim 1, wherein the comparison between the defect clusters and a representation of the physical dimensions of the head includes identifying defect clusters associated with corners of the head.

6. A method for analyzing a media surface as defined in claim 1, wherein the comparison between the defect clusters and a representation of the physical dimensions of the head includes identifying defect clusters associated with at least one edge of the head.

7. A method for analyzing a media surface as defined in claim 1, wherein a bit-error threshold for detecting data sectors having errors indicative of media defects is lower than a bit-error threshold used by the disk drive for placing data sectors on a defect list for preventing data storage in the listed data sectors.

8. In a disk drive having a plurality of magnetic media surfaces on rotating disks, and having read/write heads that each are associated with a respective media surface, a method for analyzing the plurality of media surfaces for indications of head impacts, comprising the steps of:

scanning the plurality of media surfaces to detect errors indicative of media defects;

recording location information for each detected error;

identifying defect clusters based on the location information;

generating a confidence factor for each defect cluster based on a comparison between the defect cluster and a representation of the physical dimensions of the heads;

combining the confidence factors of defect clusters at corresponding locations on the plurality of media surfaces to generate a combined confidence factor that indicates impacts between the heads and the respective media surfaces; and determining whether the combined confidence factor indicates impacts between the plurality of heads and the respective media surfaces.

9. A method for analyzing a media surface as defined in claim 8, wherein the comparison between each defect cluster and a representation of the physical dimensions of the heads includes identifying defect clusters associated with corners of the heads.

10. A method for analyzing a media surface as defined in claim 8, wherein the comparison between the defect clusters and a representation of the physical dimensions of the head includes identifying defect clusters associated with at least one edge of the head.

11. A method for analyzing a media surface as defined in claim 8, wherein a bit-error threshold for detecting data sectors having errors indicative of media defects is lower than a bit-error threshold used by the disk drive for placing data sectors on a defect list for preventing data storage in the listed data sectors.

12. A disk drive having a rotating disk with a magnetic media surface and having a read/write head, comprising:

means for scanning a media surface to detect errors indicative of media defects;

means for recording location information for each detected error;

means for identifying defect clusters based on the location information;

means for generating at least one confidence factor based on a comparison between the defect clusters and a representation of the physical dimensions of the head; and means for determining whether the at least one confidence factor indicates an impact between the head and the media surface.

13. A disk drive as defined in claim 12, wherein the comparison between the defect clusters and a representation of the physical dimensions of the head includes identifying defect clusters associated with corners of the head.

14. A disk drive as defined in claim 12, wherein the comparison between the defect clusters and a representation of the physical dimensions of the head includes identifying defect clusters associated with at least one edge of the head.

15. A disk drive as defined in claim 12, wherein a bit-error threshold for detecting data sectors having errors indicative of media defects is lower than a bit-error threshold used by the disk drive for placing data sectors on a defect list for preventing data storage in the listed data sectors.

16. A disk drive having a plurality of magnetic media surfaces on rotating disks, and having read/write heads that each are associated with a respective media surface, comprising:

means for scanning the plurality of media surfaces to detect errors indicative of media defects;

means for recording location information for each detected error;

means for identifying defect clusters based on the location information;

means for generating a confidence factor for each defect cluster based on a comparison between the defect cluster and a representation of the physical dimensions of the heads;

means for combining the confidence factors of defect clusters at corresponding locations on the plurality of media surfaces to generate a combined confidence factor that indicates impacts between the heads and the respective media surfaces; and means for determining whether the combined confidence factor indicates impacts between the plurality of heads and the respective media surfaces.

17. A disk drive as defined in claim 16, wherein the comparison between each defect cluster and a representation of the physical dimensions of the heads includes identifying defect clusters associated with corners of the heads.

18. A disk drive as defined in claim 16, wherein the comparison between the defect clusters and a representation of the physical dimensions of the head includes identifying defect clusters associated with at least one edge of the head.

19. A disk drive as defined in claim 16, wherein a bit-error threshold for detecting data sectors having errors indicative of media defects is lower than a bit-error threshold used by the disk drive for placing data sectors on a defect list for preventing data storage in the listed data sectors.

\* \* \* \* \*